（12）United States Patent  
Beaudoin et al.

(10) Patent No.: US 10,158,924 B2
(45) Date of Patent: *Dec. 18, 2018

(54) METHOD FOR THE TRANSMISSION AND DISTRIBUTION OF DIGITAL TELEVISION SIGNALS (75) Inventors: Scott Beaudoin, O'Fallon, MO (US); Scott Jones, Tulsa, OK (US); Scott Brillhart, Broken Arrow, OK (US); Michael Brown, University City, MO (US); Ryan Korte, Highland, IL (US)

(73) Assignee: Level 3 Communications, LLC, Broomfield, CO (US)

( * ) Notice: Subject to any disclaimer, the term of this patent is extended or adjusted under 35 U.S.C. 154(b) by 184 days.

This patent is subject to a terminal disclaimer.

(21) Appl. No.: 13/465,966

(22) Filed: May 7, 2012

(65) Prior Publication Data

US 2012/0219012 A1    Aug. 30, 2012

Related U.S. Application Data (63) Continuation of application No. 10/769,465, filed on Jan. 30, 2004, now Pat. No. 8,175,020.

(51) Int. Cl.
*H04N 21/65* (2011.01)
*H04L 29/06* (2006.01)
(Continued)

(52) U.S. Cl.
CPC ... *H04N 21/64322* (2013.01); *H04N 21/2343* (2013.01); *H04N 21/2381* (2013.01); *H04N 21/6405* (2013.01); *H04N 21/64707* (2013.01)

(58) Field of Classification Search
CPC ........ H04L 29/06068; H04L 29/06095; H04N 21/64707; H04N 21/65; H04N 2201/0015; H04N 21/2343
(Continued)

(56) References Cited

U.S. PATENT DOCUMENTS 5,343,240 A   8/1994   Yu
5,499,046 A   3/1996   Schiller et al.
(Continued)

FOREIGN PATENT DOCUMENTS

WO   WO-1999/59335 A1   11/1999
WO   WO 200186868      11/2001
(Continued)

OTHER PUBLICATIONS

"AASTRA : Wavestar Digital Video System", http://www.broadcast.harris.com/digital-video/pdf/wavestar-dvs_1.pdf [retrieved on Jan, 11, 2012] XP002666938 , 24 pgs.
(Continued)

*Primary Examiner* — Faruk Hamza
*Assistant Examiner* — Abusayeed M Haque (57) ABSTRACT A system for the end-to-end delivery of digital television signals. In a preferred embodiment a digital television signal is: received from production equipment, typically in BD format at approximately 1.4 gigabits per second (Gbps); the received signal is transmitted to a venue point-of-presence; converted for transmission via a 270 Mbps local loop; transmitted to a fiber network point of presence/video service edge; packetized into TCP/IP packets in a video gateway; and routed to one or more destination addresses via the fiber network; received at one or more video service edge destinations; converted to a digital television format, typically SDI; and either transmitted via a second 270 Mbps local loop for delivery to a customer site and subsequent conversion to a 1.4 Gbps HD signal, or converted directly to a 1.4 Gbs HD signal at the receiving video service edge.

14 Claims, 7 Drawing Sheets (51) Int. Cl.
*H04L 12/701* (2013.01)
*H04N 21/2389* (2011.01)
*H04N 21/643* (2011.01)
*H04N 21/2343* (2011.01)
*H04N 21/2381* (2011.01)
*H04N 21/6405* (2011.01)
*H04N 21/647* (2011.01)

(58) Field of Classification Search
USPC .................................................. 370/466
See application file for complete search history.

(56) References Cited

U.S. PATENT DOCUMENTS

| | | | |
|---|---|---|---|
| 5,577,042 A | 11/1996 | McGraw, Sr. et al. | |
| 6,026,164 A | 2/2000 | Sakamoto et al. | |
| 6,028,639 A * | 2/2000 | Bhatt | H04N 5/46 348/441 |
| 6,195,368 B1 | 2/2001 | Gratacap | |
| 6,259,695 B1 * | 7/2001 | Ofek | 370/389 |
| 6,292,490 B1 | 9/2001 | Gratacap et al. | |
| 6,323,789 B1 | 11/2001 | Lawrence | |
| 6,351,471 B1 | 2/2002 | Robinett et al. | |
| 6,351,474 B1 | 2/2002 | Robinett et al. | |
| 6,498,667 B1 | 12/2002 | Masucci et al. | |
| 6,519,693 B1 | 2/2003 | Debey | |
| 6,523,178 B1 | 2/2003 | Todogawa et al. | |
| 6,532,562 B1 | 3/2003 | Chou et al. | |
| 6,618,363 B1 | 9/2003 | Bahl | |
| 6,959,003 B1 * | 10/2005 | Shinohara | H04N 5/268 348/E5.057 |
| 6,965,937 B2 | 11/2005 | Gaddis et al. | |
| 7,046,251 B2 * | 5/2006 | Tarr | G11B 27/034 348/575 |
| 7,099,388 B2 | 8/2006 | Cooper | |
| 7,110,457 B1 * | 9/2006 | Chen | H04H 20/33 375/240.25 |
| 7,212,574 B2 * | 5/2007 | Abrams, Jr. | H04N 9/8042 375/240.25 |
| 7,327,959 B2 | 2/2008 | Pelletier et al. | |
| 7,522,551 B2 * | 4/2009 | Giaimo | H04W 40/00 370/328 |
| 7,586,899 B1 | 9/2009 | Mohaban et al. | |
| 7,949,052 B1 * | 5/2011 | Wu | H04N 21/236 341/102 |
| 2001/0017667 A1 | 8/2001 | Frink et al. | |
| 2002/0065938 A1 | 5/2002 | Jungck et al. | |
| 2002/0130968 A1 | 9/2002 | Meyer | |
| 2002/0191116 A1 * | 12/2002 | Kessler | H04N 21/44004 348/723 |
| 2003/0099355 A1 * | 5/2003 | Moroney | H04N 7/1675 380/210 |
| 2003/0112338 A1 | 6/2003 | Pelletier et al. | |
| 2003/0128301 A1 | 7/2003 | Tarr et al. | |
| 2003/0156218 A1 | 8/2003 | Laksono | |
| 2003/0185301 A1 * | 10/2003 | Abrams, Jr. | H04N 9/8042 375/240.12 |
| 2003/0228093 A1 | 12/2003 | Notani | |
| 2004/0017949 A1 * | 1/2004 | Lin | H04N 19/587 382/232 |
| 2004/0213160 A1 | 10/2004 | Regan et al. | |
| 2005/0015805 A1 * | 1/2005 | Iwamura | 725/79 |
| 2005/0114903 A1 | 5/2005 | Ahmed et al. | |
| 2006/0274734 A1 * | 12/2006 | DeMartino | H04L 12/2856 370/352 |
| 2007/0160142 A1 | 7/2007 | Abrams | |

FOREIGN PATENT DOCUMENTS

WO WO-2002/080556 A1 10/2002
WO WO-2003005699 A2 1/2003

OTHER PUBLICATIONS

Anonymous: "MPLS Based Transparent LAN Services", Riverstone Networks, 'Online! 2002; XP002319185 2002, pp. 1-9.
"ATSC: Status of station implementations and interface standards", *Advanced Television Systems Committee*, 'Online XP002319187 Jun. 24, 1998, 1-92.
Canadian Office Action dated Jul. 19, 2010, in counterpart Canadian App. No. 2554881, filed Dec. 2, 2004, 4 pgs.
European Search Report, dated Jan. 24, 2012, European App. No. 10189939.1, 13 pgs.
"MPLS Based Transparent LAN Services", No. 14 Technology White Paper, Riverstone Networks Oct. 28, 2002, 9 pgs.
"NTT: i-Visto gateway", *NNT,* 'Online!XP002319186 Mar. 24, 2003 , 1-2.
"PYTHON: Multichannel Fiber Optic HDTV/SDTV System", *Telecast, Online!*XP002319188.
"Snell & Wilco: DTV Options for Transmission", *Internet Article* 'Online!XP002319184 Oct. 26, 2001 , 1-8.
"Telecast to show new fiber-optice multiplexor at NAB2001", http://www.digitalbroadcasting.com/article.mvc/telecast-to-show-new-fiber-optic-multiplexer-001 ? VN ETCOOKIE=N0 Jan. 29, 2001 , 2 pgs.
Holland, G. , "Multi-Service Cable Network", *Riverstone Networks,* 'Online!2002 XP002319189 2002 , 1-15.
European Examination Report, dated May 22, 2014, Application No. 10189939.1, filed Dec. 2, 2004; 10 pgs.
Hur, N. et al., "Experimental Service of 3DTV Broadcasting Relay in Korea", *Proceedings of SPIE, S P I E—International Society for Optical Engineering, US* vol. 4864, XP 002358791, ISSN 0277-786X, DOI: 10.1117/12.454904 Jan. 1, 2002 , pp. 1-13
European Examination Report, dated May 21, 2013, Application No. 04812675.9, 6 pgs.
Summons to Attend Oral Proceedings, dated Jul. 6, 2016, European Application No. 04812675.9, filed Dec. 2, 2004; 4 pgs.

\* cited by examiner

METHOD FOR THE TRANSMISSION AND DISTRIBUTION OF DIGITAL TELEVISION SIGNALS

CROSS REFERENCE TO RELATED APPLICATIONS

This application claims the benefit of priority to co-pending U.S. patent application Ser. No. 10/769,465, filed Jan. 30, 2004, titled "METHOD FOR THE TRANSMISSION AND DISTRIBUTION OF DIGITAL TELEVISION SIGNALS," which is incorporated herein by reference for all purposes.

FIELD OF THE INVENTION

The present invention relates to a method for the transmission and distribution of digital television (DTV) signals. More particularly, but not by way of limitation, the present invention relates to a method for converting DTV signals to a format for transmission over a communication network, and transmitting the signal via the communication network to a remote location.

BACKGROUND OF THE INVENTION

While the quest for high-definition television ("HDTV" or "HD") has been hampered by the lack of a single standard, resistance by the broadcast industry to implementation, and a substantial price disparity at the consumer level, mandates from the Federal Communication Commission are forcing broadcasters and equipment manufacturers to transition from conventional analog transmission to digital television transmission. These mandates are certain to finally usher in the era of DTV, improving the quality of standard definition television ("SDTV" or "SD") and advancing the cause of HDTV. As digital programming becomes more prevalent, the need for infrastructure for the production and distribution of digital programming becomes more pressing.

Most of the existing infrastructure was developed for the distribution of analog video, and an assortment of options presently exist as to the production and distribution of analog programming. Distribution via satellite, microwave link, or digitally through a fiber network, or even over conventional wires are common place. Arrangements can be made for a live broadcast from almost anywhere in the world with little more than a few hours notice. Unfortunately, while the video signal may be digitized over some portion of its path, it starts out as an analog signal and is delivered as an analog signal. End-to-end delivery of digital video is just beginning to evolve.

Presently, satellite transponders are available which will carry DTV signals, however the issue of bandwidth is, at best, confusing. Data rates vary widely from satellite-to-satellite and transponder sharing further complicates the issue. A producer who plans on sending a DTV signal via satellite must negotiate bandwidth as well as cost. Regardless of these issues, satellite bit rates for a single transponder are limited to roughly 100 Mbps. As a result, for satellite transmission of DTV, some form of compression is virtually always required. For transmission of HDTV signals via satellite, substantial compression is absolutely necessary. As discussed further hereinbelow, compression raises additional concerns.

Compression techniques can be broadly divided into two categories: 1) lossy techniques; and 2) non-lossy techniques. Generally speaking, lossy compression techniques compress a signal in a manner designed to faithfully reproduce the content at the receiving end while not faithfully recreating the original digital signal. Non-lossy compression techniques faithfully reproduce the original data stream, thus ensuring that the content at the receiving end is identical to that at the transmitting end. Lossy compression techniques have emerged as the standard simply because such schemes provide significantly higher rates of compression over their non-lossy counterparts. Many of the aggressive compression schemes employ forward interpolation which, in terms of video signals, means that the information displayed in the current video frame is at least partially dependent on information contained in one or more future video frames. The result is that these compression techniques, by necessity, add delay to the signal. In general terms, as the data rate increases, the amount of compression decreases and the adverse effects of compression, i.e. fidelity of the output relative to the input and delay, to are reduced.

Thus, besides bandwidth and cost, a producer must also ensure a chosen transponder can accommodate the format of the compressed data stream and must determine if the accumulated delays are acceptable, including the transit time between the earth and satellite. The round trip distance from the earth to a satellite alone adds approximately a one-half second delay to a satellite relayed signal.

Like satellite transmissions, for the most part terrestrial infrastructure has been developed around analog video signals. While fiber networks are inherently digital in nature, bit rates offered to video programmers have been driven by traditional quality video. Simply providing more bandwidth to accommodate HDTV signals is hampered by any number of bottlenecks, such as: the data rate supported by the link between a venue and the fiber network, typically supplied by the local telephone company; the link between the fiber network and the receiving end; or even bandwidth limitations of various network elements. At many venues, the link between the venue and the fiber network is actually analog and digitization takes place at the fiber network point of presence. After digitization, even traditional analog video signals are sometimes compressed for digital transmission over the network. As with satellite transmissions, for a given video format, compressing the video signal reduces quality and introduces delay.

Another issue with transmission over terrestrial carriers is reaching multiple receivers. While satellites cover wide areas by their very nature, terrestrial video links tend to be point-to-point. While point-to-multipoint distribution is possible with either wire networks or fiber networks, a route to each receiver must be planned in advance. For live events, program production typically occurs at the venue, while commercials are added at a studio or fixed production facility. Thus the possibility exists that there may be a need for point-to-multipoint delivery both for the original feed from the venue and for the finished programming including commercials. With millions of dollars of revenue on the line, not only does such an event warrant the provisioning of dedicated routes in advance, but also the provisioning of redundant paths to avoid lost programming in the case of a network event such as a fiber cut.

Still another issue in producing and distributing television programming is monitoring the broadcast video, including commercials, at the venue. Even with analog programming, returning finished video to the production truck is problematic. If the finished video is transmitted to network affiliates via satellite, a satellite dish may be used at the venue to receive the signal. Alternatively, if the programming is carried by a local station, the signal can be monitored directly off-the-air. However, local programming may also include locally inserted commercials or content which overlaps the network programming. Yet another alternative is to provision identical infrastructure assets to return the programming as were used to transmit the original signal. This technique could effectively double the cost of distribution.

Yet another issue in the transmission of digital television signals is maintaining synchronization between video and audio portions of the signal. Generally speaking, the delays caused by distance and compression are substantially constant. Once the audio is synchronized to the video, it will stay synchronized. Problems with synchronization arise when the audio signal takes a different path from that of the video signal and the delay in one of the paths is variable, or when the delay introduced through compression is variable.

Thus it is an object of the present invention to provide a system and method for the end-to-end delivery of digital television signals.

Thus it is a further object of the present invention to provide a system and method for the end-to-end delivery of digital television signals with embedded, synchronized audio programming.

It is yet a further object of the present invention to provide a system and method for the end-to-end delivery of digital television signals in a point-to-multipoint environment.

It is yet a further object of the present invention to provide a system and method for the end-to-end delivery of digital television signals via a network conducive to automated provisioning of network resources for a given program.

SUMMARY OF THE INVENTION

The present invention provides a system for the end-to-end delivery of digital television signals. In a preferred embodiment a digital television signal is: received from production equipment, typically in HD format at approximately 1.4 gigabits per second (Gbps); the received signal is transmitted to a venue point-of-presence; converted for transmission via a local digital loop; transmitted to a network point of presence/video service edge; packetized into data packets in a video gateway; and routed to one or more destination addresses via the data network; received at one or more video service edge destinations; converted to a digital television format, typically SDI; and either transmitted via a second local digital loop for delivery to a customer site and subsequent conversion to a 1.4 Gbps HD signal, or converted directly to a 1.4 Gbs HD signal at the receiving video service edge.

In another preferred embodiment TCP/IP packets are transmitted via dedicated routes which are determined and scheduled prior to the video transmission. Optionally, when finished programming is returned to the venue, a symmetric path can be provisioned for the returning program so that the need for duplicate dedicated network assets is reduced and to facilitate point-to-multipoint distribution.

In still another preferred embodiment audio information is encoded in TCP/IP packets and embedded with video traffic along the same network routes. When routes are determined in advanced and dedicated to carrying the video program, packets arrive in the same order as sent, thus ensuring the audio program remains synchronized with the video program.

In still another preferred embodiment television signals are digitally transmitted end-to-end from a venue to a customer site wherein at least a portion of the transmission takes place over a multi-protocol label switching ("MPLS") network. Preferably packetized video information enters the MPLS network through a label edge router which adds a label to each video packet containing routing information for the packet.

In yet another preferred embodiment, digital video information is carried over a data network wherein the egress node includes a memory buffer of sufficient length to remove jitter in the signal caused by routing delays.

Further objects, features, and advantages of the present invention will be apparent to those skilled in the art upon examining the accompanying drawings and upon reading the following description of the preferred embodiments.

DESCRIPTION OF THE PREFERRED EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

As will become apparent on reading the description of the preferred embodiments, while the inventive system is not limited to a single network architecture, to in the preferred embodiments DTV information is transmitted, at least in part, over a multiprotocol label switching ("MPLS") network. Such networks are well known in the art and, with the exception of specialty label ingress nodes and label egress nodes, as discussed further hereinbelow, the MPLS network of the present invention is conventional in nature.

In a MPLS network, packets are assigned a label at an ingress mode. In practical terms, the label defines a route through the network. At each node, the label provides an index into a routing table which provides the next network hop and a new label which is meaningful to the next node of the network. A number of options are available for label handling at each node. While MPLS networks are designed for fast routing, the inherent ability to designate and manage routes in advance of even the first packet of data is of particular interest to the present invention.

Referring now to the drawings, wherein like reference numerals indicate the same parts throughout the several views, a block diagram of the inventive system for transmitting DTV signals is shown in FIG. 1A-E. Beginning with FIG. 1D, digital video, typically BD video, is delivered from a production truck, or other video source, via conductor 20, which is may be either fiber or copper wire, typically carrying BD at a data rate of 1.485 Gbps. Typically the digital video stream will be in conformance with a published standard, such as SMPTE 292 as promulgated by the Society of Motion Picture and Television Engineers.

Figure 1A:
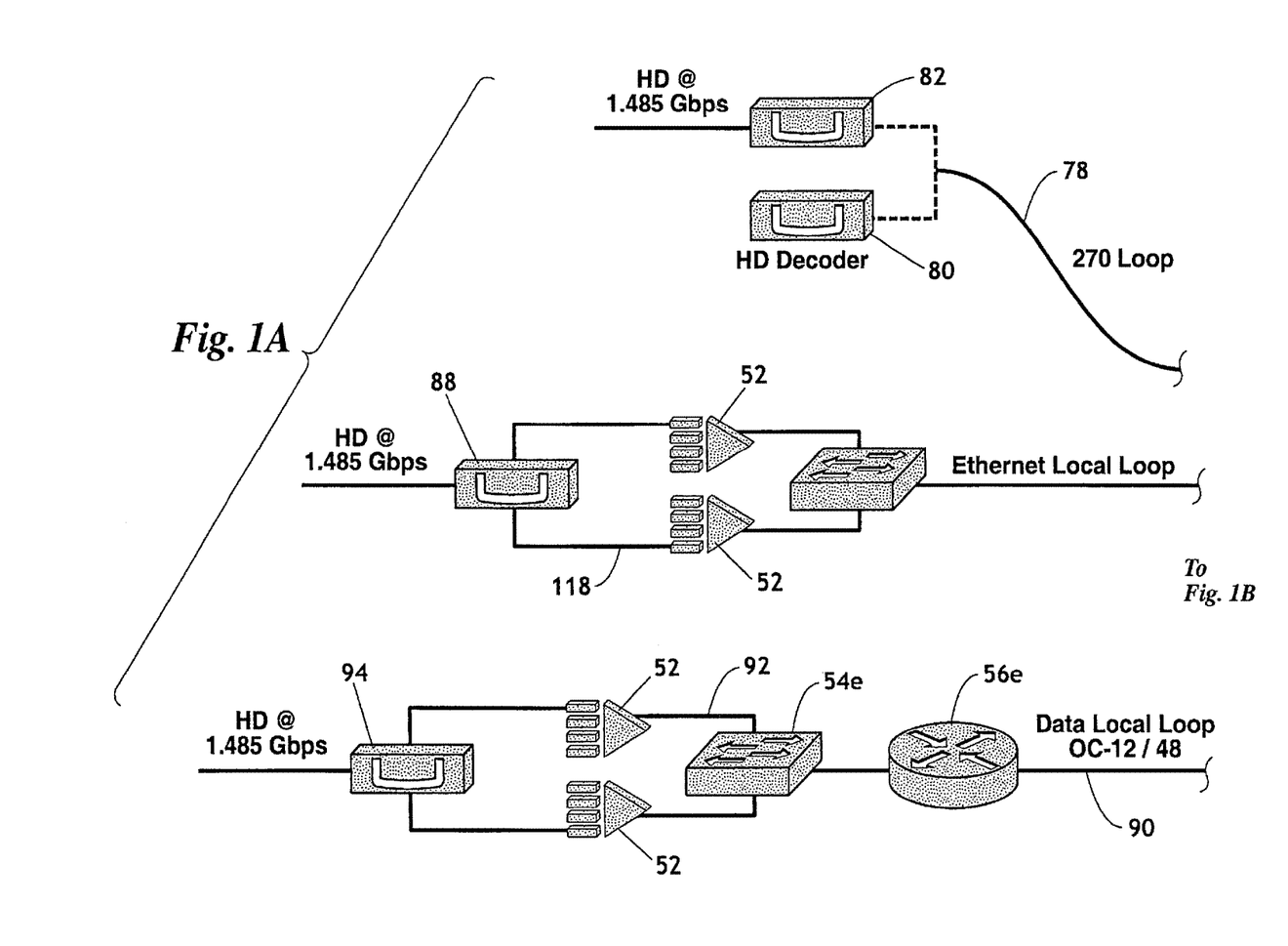
FIG. 1A provides a block diagram of preferred embodiments of digital video outputs at a customer site.
Figure 1B:
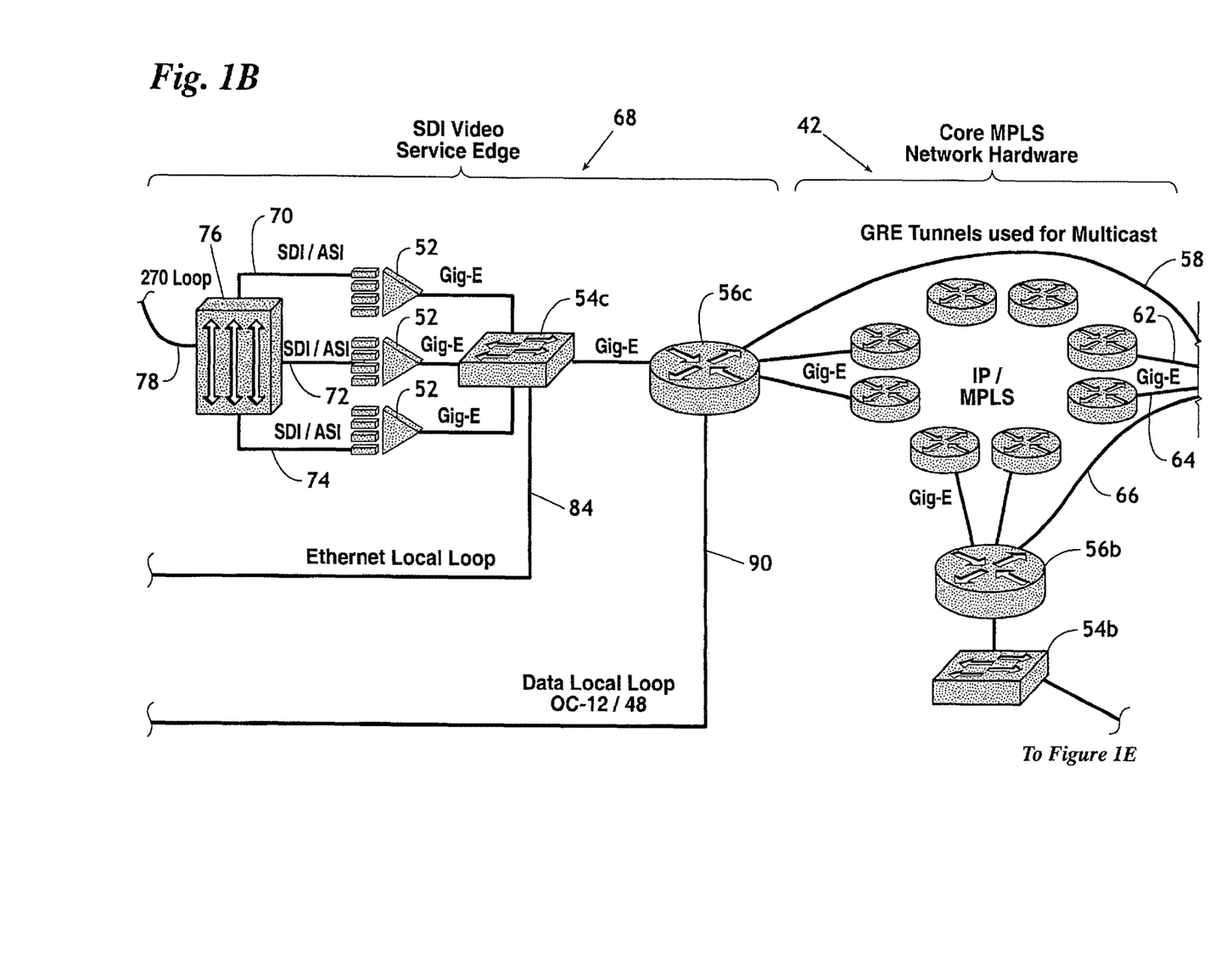
FIG. 1B provides a block diagram of a video service edge at a label egress node in communication with the core MPLS network as employed in the preferred embodiments of the inventive system.

At a typical venue, conversions are performed at or near the production equipment. First, if the signal is received optically, the signal is converted to electrical by distribution amplifier 24. Next the HD signal is encoded at 270 Mbps by encoder 22 for transmission over cable 26, preferably in either SDI or ASI format. The conversion from HD to 270 Mbps allows the signal to negotiate throughput bottlenecks.

As will be appreciated by those skilled in the art, 270 Mbps is a standard SD data rate and is preferably in conformance with SMPTE 259M, or a similar published standard. Terms associated with 270 Mbps digital video include "serial data interface" ("SDI") which generally refers to data in conformance with SMPTE 259M and "asynchronous serial interface" ("ASI") which generally refers to digital video compressed according to the DVB standard.

As will also be appreciated by those skilled in the art, the HD-to-SD encoding and conversion from an optical data stream to an electrical data stream are known in the art. One such system for performing these operations is the model 7700 HD series available from Evertz Microsystems, Ltd. of Burlington, Ontario, Canada.

Figure 1D:
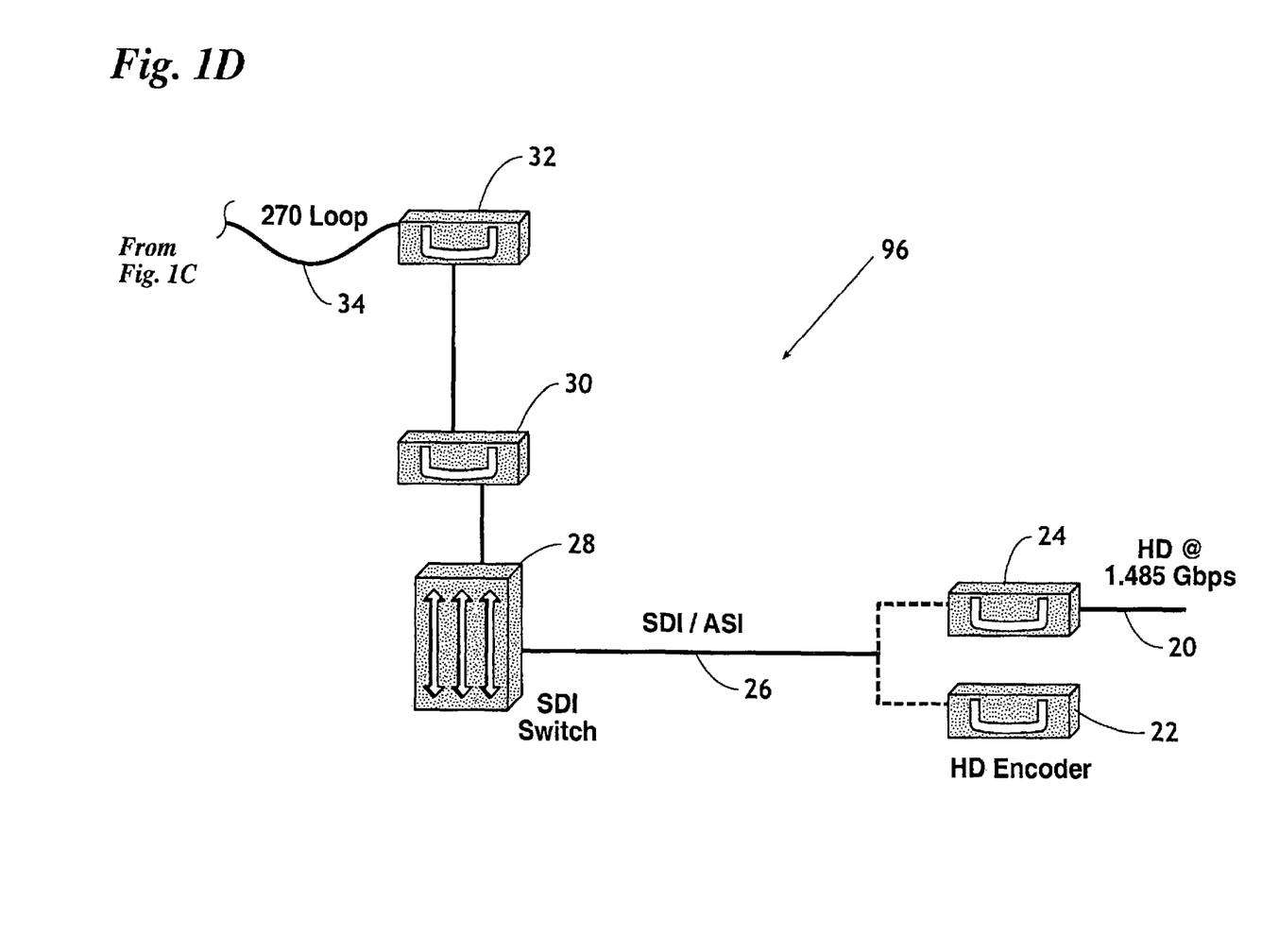
FIG. 1D provides a block diagram of a preferred embodiment of digital video input at a venue.
Figure 2:
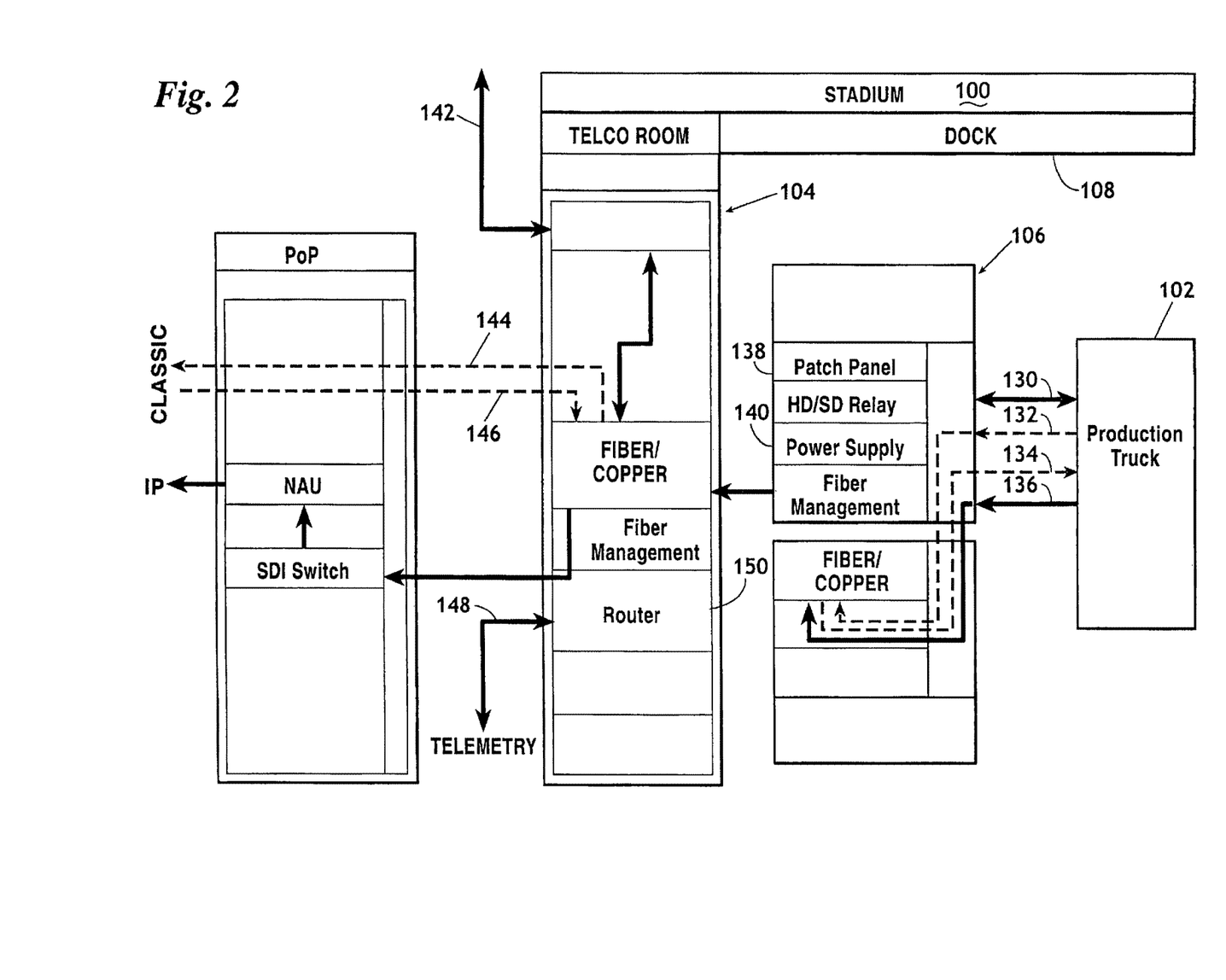
FIG. 2 provides a block diagram of a preferred video management system at a venue.

Next, an SDI switch 28 allows the digital video signal to be switched between redundant paths (not shown) in the event of a failure. From switch 28, the video signal is directed to distribution amplifier 30 for conversion from electrical to optical. With further reference to FIG. 2, the conversion from electrical to optical overcomes distance issues within the venue as the signal is transported from the mezzanine level equipment 106 located at dock 108 to a telecommunication room 104 at the venue 100.

Figure 1C:
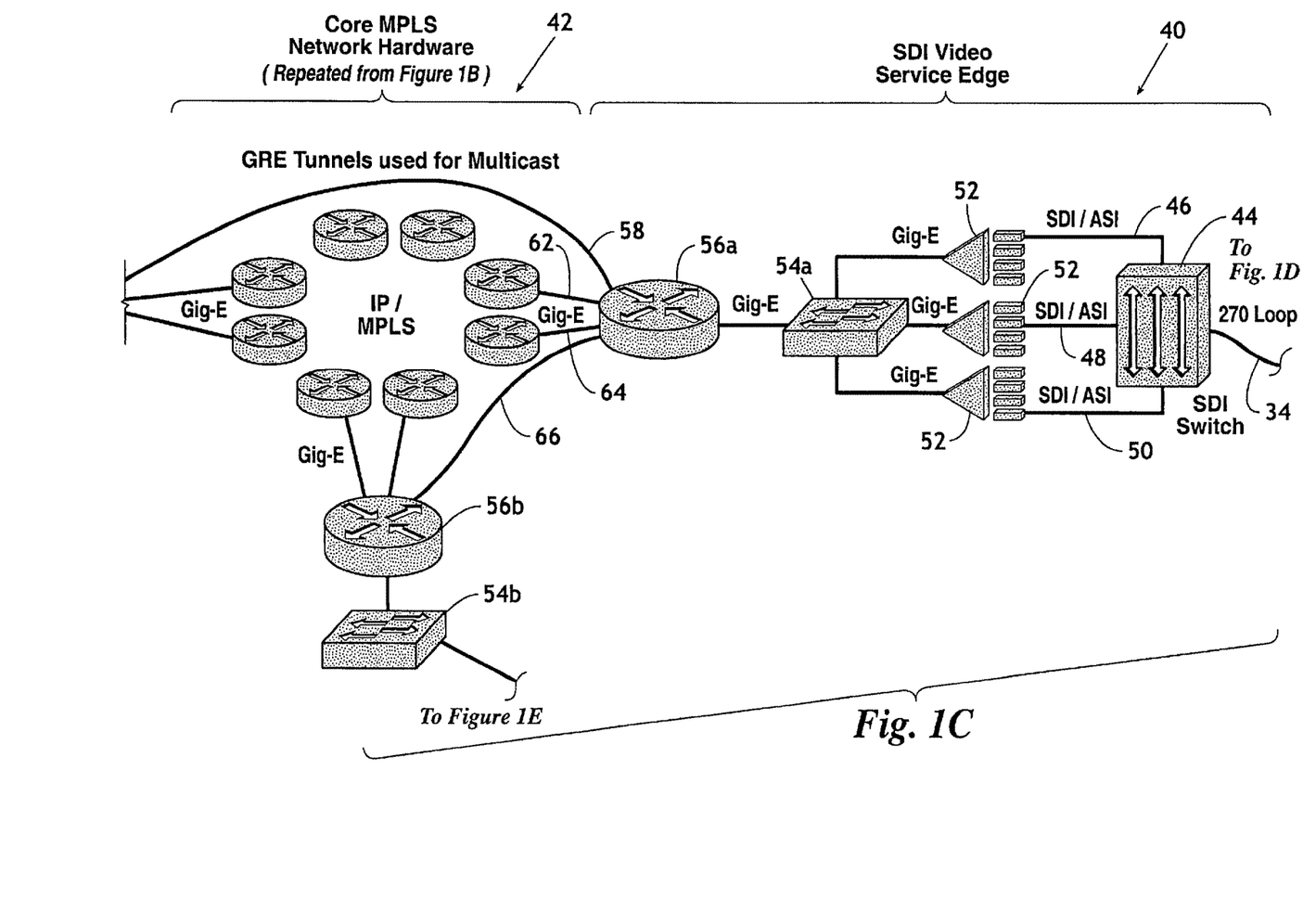
FIG. 1C provides a block diagram of a video service edge at a label ingress node in communication with the MPLS core network as employed in the preferred embodiments of the inventive system.

At the telecommunications room, the signal is converted back from an optical signal to an electrical signal by distribution amplifier 32 and, with further reference to FIG. 1C, transmitted via a 270 Mbps digital loop 34 provided by a local exchange carrier to a fiber network point-of-presence 40. As discussed hereinabove, preferably the fiber network is an MPLS network 42. Thus, in a preferred embodiment the network point-of-presence 40 is a video service edge, which is a specialized label ingress node for the MPLS network.

At video service edge 40, SDI video is delivered to SDI switch 44 which allows video to be switched between redundant paths 46, 48, and 50. Preferably paths 46, 48, and 50 each include a video gateway 52. A video gateway 52 either: receives digital video, i.e. SDI or ASI video, and outputs video formatted in TCP/IP packets; or receives video formatted in TCP/IP packets and outputs video in a selected serial format such as SDI or ASI. At ingress video node 40, video gateway 52 receives serial video data and outputs packetized video data. One such video gateway is the model CX1000 video gateway manufactured by Path 1 Network Technologies, Inc. of San Diego, Calif.

Along each path 46, 48, and 50, from gateWays 52 the signals are sent via gigabit ethernet links, or similar high speed network, to router 54a. From router 54a packetized data is sent to label edge router 56a. As discussed above, a label edge router has the responsibility for tagging incoming packets with labels which ultimately determine the route taken through the network by the packet. While in an MPLS network, the destination edge router has the responsibility for initiating the generation of labels for a given route, it is preferable in the inventive system to schedule the routes and generate the routing tables in advance of the televised event. Thus, when video packets arrive at label edge router 56a from gateways 52, router 56a will simply add a predetermined label and pass the packet along the first network hop on network 42. One router capable of operating as a label edge router and suitable for use with the present invention is the model M20 router from Juniper Networks, Inc. of Sunnyvale, Calif.

With further reference to FIG. 1B, wherein the core MPLS network 42 is again shown, the packetized video data can take one or more routes through network 42. For purposes of point-to-multipoint transmission, a generic routing encapsulation ("GRE") tunnel 58 is used to essentially create a private network within the larger network. Packets can also be transmitted from the label edge router 56a at the ingress node 40 into the network 42 and routed through the network as normal traffic through connections 62 and 64, keeping in mind that the route is still scheduled and preferably dedicated to the video programming. Still yet, a direct route 66 between label edge router 56a and label edge router 56b may be possible.

Regardless of the routing method employed, packetized video is delivered to video service edge 68, a specialized label egress node, at label edge router 56c. In one preferred embodiment, video at video service edge 68 is handled in a reverse fashion as that of the label ingress node 40 described above. Data is sent to router 54c, directed through redundant paths 70, 72, and 74 to video gateways 52 which receive the TCP/IP packets containing video information and restore the SDI or ASI video signal. Preferably, gateways 52 include a video buffer of sufficient length to eliminate jitter in the outgoing serial data caused by routing delays in network 42. In the preferred embodiment the range of accumulated routing delays can be calculated and/or measured so that the video buffer within gateway 52 can be sized to be no longer than necessary to remove the worst case potential jitter. As will be apparent to those skilled in the art, buffer length has a direct impact on delaying the video signal. Thus the buffer should be of the minimum length required to remove all potential jitter.

From gateways 52 the serial video data is directed to an SDI switch 76 allowing selection of the video from one of paths 70, 72, and 74 for transmission via 270 Mbps loop 78. Like loop 34 (FIG. 1D), 270 Mbps loop 78 is typically supplied by the local exchange carrier. With further reference to FIG. 1A, serial video data is transmitted to a customer facility via loop 78 where a conversion is performed from SDI or ASI to HD at 1.485 Gbps by convertor 80 and optionally converted to optical format in distribution amplifier 82.

In another preferred embodiment, where label edge server 56c is at, or near the customer site, video packets can be delivered from router 54c directly to the customer site via ethernet local loop 84. Packetized video data is then delivered to router 54d, directed to video gateway 52 along path 86, converted from TCP/IP packets to SDI, ASI, or the like, in gateway 52 and restored to BD at 1.485 Gbps in decoder 88.

In still another preferred embodiment, an optical fiber 90 connects the fiber network with the customer site. Data is then routed from router 56c to router 56e. It should be noted that two options are available. First, router 56c can remain the label egress node, strip the label from outbound packets and deliver data to router 56e as TCP/IP packets. Alternatively, router 56*e* can become the label egress node, receive MPLS packets from router 56*c* and locally convert the packets back to TCP/IP. Either way, TCP/IP packets are delivered to router 54*e*, and directed to gateway 52 along path 92. Within gateway 52 the packetized data is restored to an SDI or ASI data stream and directed to decoder 94. An HD data stream at 1.485 Gbps is then provided to the customer.

Figure 1E:
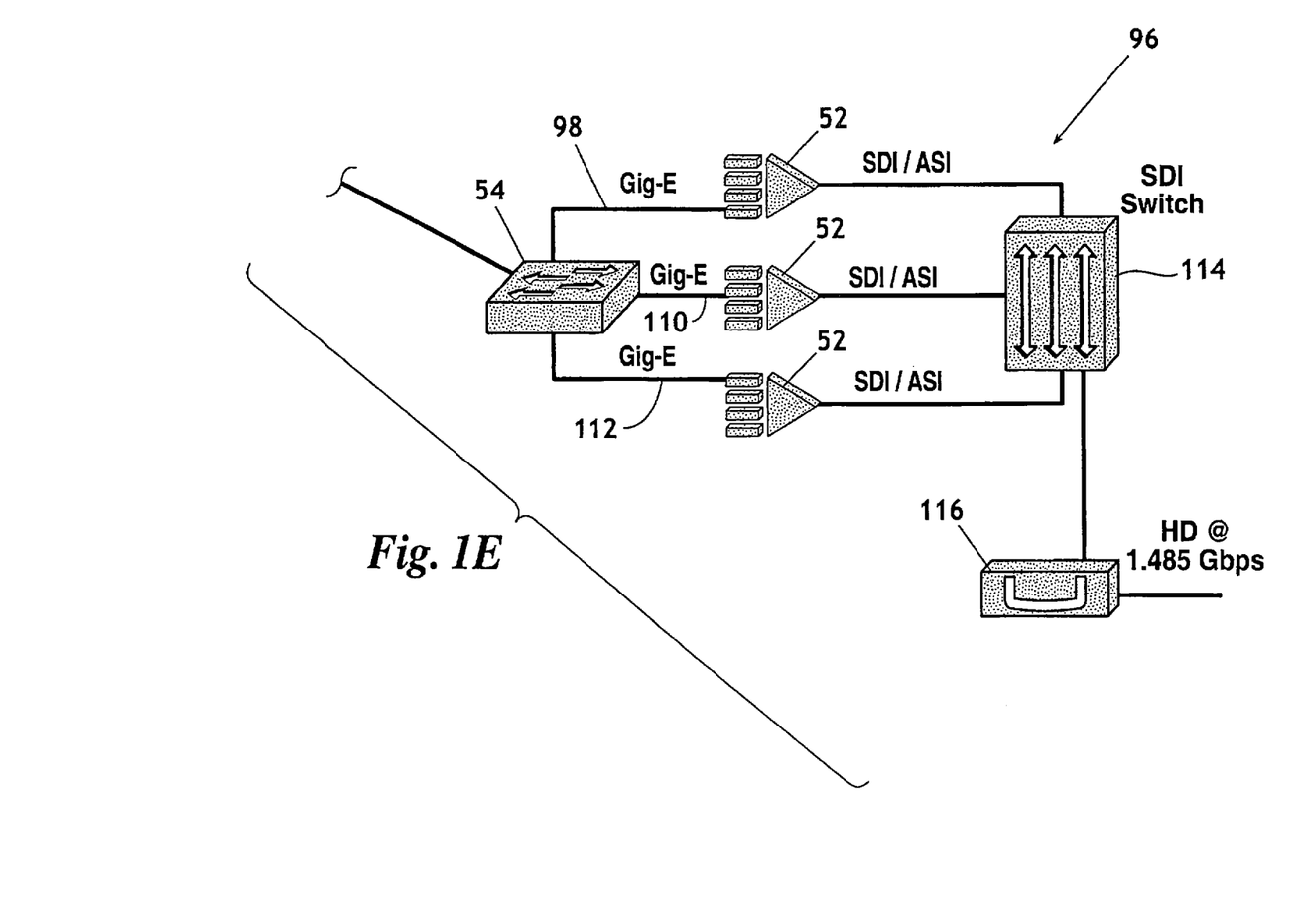
FIG. 1E provides a block diagram of an egress node at a television operations center.

Turning next to FIGS. 1B and 1E, in many cases it is desirable to simultaneously deliver the signal to a network operator's television operations control facility 96. As will be apparent to those skilled in the art, video packets are simply routed to label edge router 56*b* where label information is removed from the packet and the original TCP/IP packet is delivered to router 54*b*. From router 54*b*, data is sent to router 54*f* and forwarded to video gateways 52 along paths 98, 110, and 112. As before, gateways 52 restore the original serial video data stream, i.e. SDI, ASI, or the like, from the received TCP/IP packets. Data is then switched via SDI switch 114 and converted from SD to HD in decoder 116.

It should be noted that the system for the delivery of HD signals described above is capable of bidirectional operation. Thus, for example, at a customer site commercials may be added it the original signal, and re-transmitted via the MPLS network back to other video service edges on the network. In such a configuration, a video service edge, i.e. edge 68, may be a label egress node with respect to the original program and a label ingress node with respect to the fully produced program. Thus, at the customer site shown in FIG. 1A for example, path 118 could supply SDI video to gateway 52 which packetizes the signal and forwards it to video service edge 68 via router 54*d*.

It should also be noted that, in terms of point-to-multipoint operation, GRE tunnel 58 is preferably symmetric in nature, network traffic in one direction follows exactly the same route as network traffic in the opposite direction. While necessary for point-to-multipoint operation, an added benefit is that network delays and jitter are substantial the same in either direction of operation.

It should also be noted that inherent in an MPLS architecture is the ability to schedule routes in advance of the actual data flow through the network. In terms of high value programming, this allows the provisioning of network resources well in advance, allowing the network operator to ensure routes are actually available for a specific event.

Turning next to FIG. 2, in a typical configuration, a production truck 102 is parked at a stadium in an area reserved for television production equipment 108. Within 300 feet of truck 102, the practical limit for coax transmission of HDTV, mezzanine level equipment 106 is provided to support the production truck 102. Typically between truck 102 and support equipment 106 there will be: one or more conventional analog telephone lines 130 for IFB or engineering management from the customer facility; SDTV transmit line 132 for support of SD and analog broadcasting; SDTV receive line 134 for receiving fully produced video back from the customer site; and HDTV transmit line 136 for sending HDTV via the inventive system.

At the mezzanine level equipment 106 an RJ-11 panel 138 is provided for management of the telephone lines, a power supply 140 for operation of equipment; and data and fiber management as described above. From the mezzanine level equipment 106 information is passed to telco room 104 via fiber to overcome the 300 foot limitation of copper coax.

At room 104, POTS lines 142 are connected to the switched telephone public network, standard television transmit and receive lines, 144 and 146, respectively, are handled in the conventional manner through a local loop provided by the local exchange carrier, and control of the system is provided by network connection 148 directed to router 150. HDTV is directed from telco room 104 to the fiber network point-of-presence in the manner described above.

As will be apparent to those skilled in the art, using the venue system described above, the conventional broadcast is backed up by the HD broadcast in the event the classic link fails, and the broadcaster can always fall back to SD if the HD system fails. As will also be apparent to those skilled in the art, the HD signal is never analog, delivery of the HD video is digital end-to-end. In contrast, presently analog video is sent from the venue to the network point-of-presence where digitization now occurs.

Figure 3:
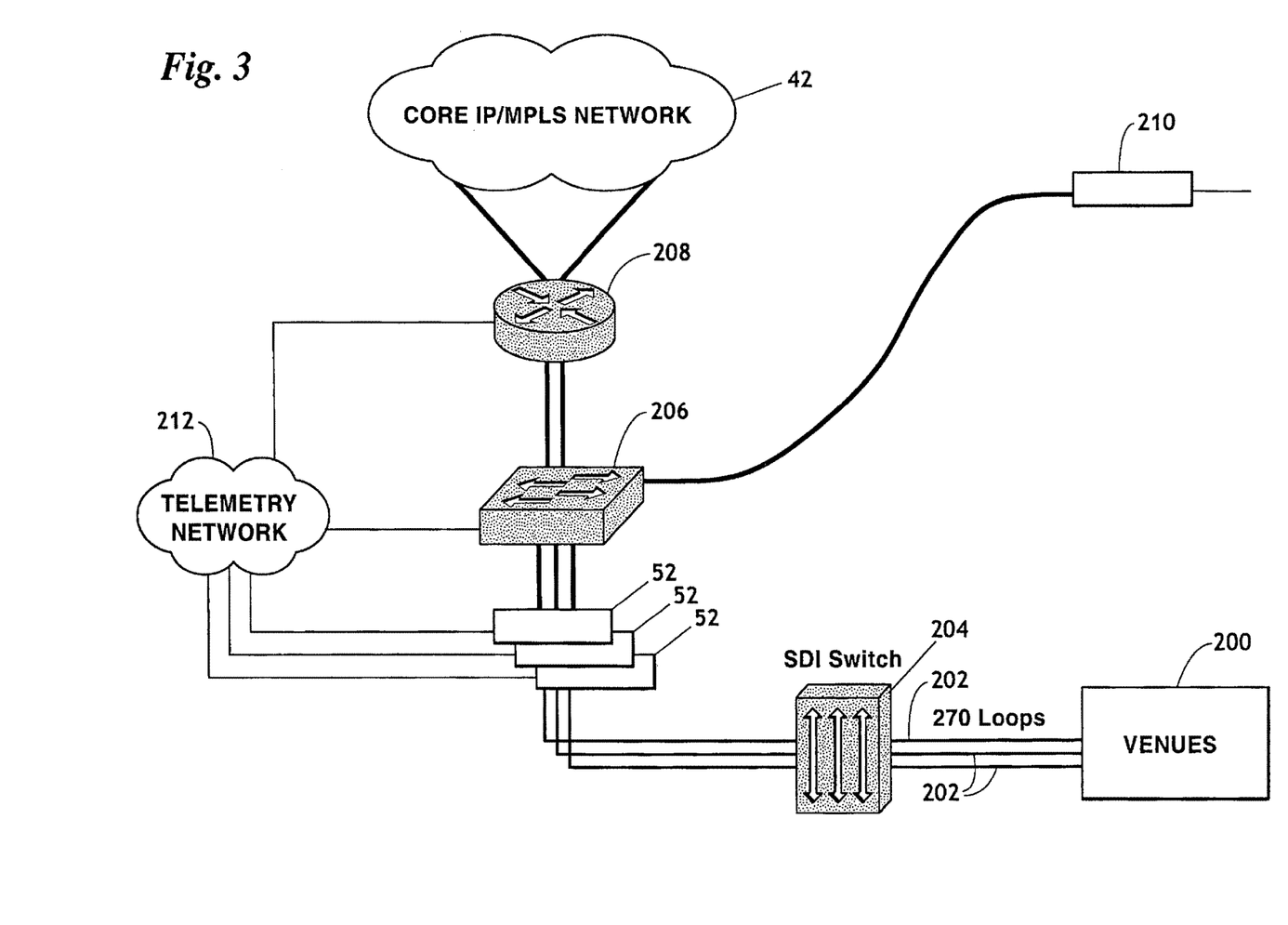
FIG. 3 provides a block diagram of redundant systems in a label ingress node.

With reference to FIG. 3, in most cities there are more than one venue which host events which are likely to be televised. A feature of the inventive system is that infrastructure is maximized at, and between, video service edges and minimized at the individual venues. In light of this feature, multiple venues 200 are each served by individual 270 Mbps loops 202. A single SDI switch 204 can be used at the video service edge to enable video distribution from any given venue only during an event. From switch 204, SDI signals are individually packetized at gateways 52 and sent to router 206 and, in turn, to label edge router 208 and MPLS network 42. End-to-end control of the system is accomplished via telemetry network 212, which may, in fact, be a subset of MPLS network 42. It should also be noted that from a video service edge, monitoring can be accomplished by directing packets from a selected source to gateway 210 which then provides serial video data.

As will be apparent to those skilled in the art, while some compression of the HD signal is necessary to perform the HD/SD conversion to 270 Mbps to accommodate the local loop and video gateway, the level of compression required is relatively small, particularly in light of the fact that the data rate is over twice that available from a satellite transponder.

Thus, providing a multicast transmission of HD video with the inventive system involves: converting the signal from HD data rates to SD data rates; converting the signal to optical for transmission within the venue; converting the signal back to electrical for transmission over a 270 Mbps loop, typically provided by the local exchange carrier from the venue to a video service edge; converting from a continuous data stream (SDI) to TCP/IP packets in video gateway; converting the electrical signal to optical; transmitting the packets over a fiber network in a multicast environment; receiving the packets at one or more video service edges; converting the packets from optical to electrical; converting from TCP/IP packets to a continuous serial data stream in a video gateway; decompressing the signal from SD data rates to HD data rates; and delivering an HD signal to a customer.

Preferably, the transmission of packets over a fiber network includes tagging each packet with a label containing routing information and transmitting the packet over an MPLS fiber network.

Optionally, the packets are transmitted via a GRE tunnel in a point-to-multipoint fashion.

It should be noted that while the preferred embodiments were described with reference to an MPLS fiber network, the present invention is neither limited to MPLS networks or fiber networks. In fact many types of networks are suitable for use with the present invention, whether electrical, optical, wireless, or otherwise, and many protocols can be employed with regard to practicing the present invention and at various network layers. Thus, by way of example and not limitation, the present invention may be practiced in ATM networks, IP networks, and the like, and such networks are within both the scope and spirit of the present invention.

It should also be noted that the term "label edge router" is used with reference to the preferred embodiments which employs an MPLS network. It is contemplated that when other types of networks are used, routers appropriate for use with the specific network will also be used. Thus, the term "router" is to interpreted broadly to include not only label edge routers but also to include any type of network router, switch, or the like.

It should be further noted that, while the preferred embodiments are described with reference to 270 Mbps loops, the invention is also not so limited. As will be recognized by those skilled in the art, any number of solutions may be available for digital communications between a venue and the video service edge and any such solution, regardless of the data rate supported, is within the scope and spirit of the present invention. By way of example and not limitations, other available digital links may include: fiber optic, coax, twisted pair, a modulated laser beam, microwave or other RF link, etc.

Finally, with regard to the mezzanine level equipment, it should be noted that the preferred embodiment is discussed in the general environment of a sports arena, stadium, or the like. As will be apparent to those skilled in the art, the precise configuration of the venue-side equipment, as depicted in FIG. 2, will depend on the environment in which it is used, the type of facility, the distance between production equipment and telecommunication facilities, etc. It is contemplated that adaptations of the venue-side equipment to accommodate the local environment are likewise within the scope and spirit of the present invention.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention.

What is claimed is:

1. A method for preparing an High Definition (HD) signal for transmission over a data network including the steps of:
   (a) receiving an HD signal at a first data rate;
   (b) converting said HD signal to a compressed HD signal at a second data rate, said second data rate being lower than said first data rate, and wherein said HD signal and said compressed HD signal are digital signals;
   (c) transmitting, from a source location, said compressed HD signal via a 270 Mbps loop to a network point-of-presence that is remote from the source location;
   (d) converting said compressed HD signal into TCP/IP packets in a video gateway for transmission over a data network; and
   (e) delivering said TCP/IP packets to a router.

2. The method for preparing HD signals for transmission over a data network of claim 1 wherein said first data rate is 1.485 Gbps.

3. The method for preparing HD signals for transmission over a data network of claim 1 wherein said second data rate is 270 Mbps.

4. The method for preparing HD signals for transmission over said data network of claim 1 wherein said first HD signal conforms to SMPTE292.

5. The method for preparing HD signals for transmission over a data network of claim 1 wherein said data network is an MPLS network and said router is a label edge router.

6. A system for preparing an High Definition (HD) signal for transmission over a data network comprising:
   an encoder for compressing an HD signal at an HD data rate to a compressed HD signal at an Standard Definition (SD) data rate, wherein said HD signal and said compressed HD signal are digital signals;
   a video gateway, remote from the encoder and configured to communicate with said encoder via a local loop to receive said compressed HD signal, wherein said compressed HD signal is configured by said video gateway into packets output through a gateway network connection; and
   a router configured to communicate with said gateway network connection to receive said packets and transmit said packets over a data network.

7. The system for preparing an HD signal for transmission over a data network of claim 6 wherein said encoder is remote from said video gateway, the system further comprising:
   a first converter in communication with said encoder for converting said compressed HD signal stream to an optical signal;
   a second converter in communication with said video gateway for converting said optical signal back to said compressed HD signal; and
   an optical fiber connecting said first and second converters to carry said optical signal from said first converter to said second converter.

8. The system for preparing an HD signal for transmission over a data network of claim 6 wherein the local loop comprises a 270 Mbps loop.

9. The system for preparing an HD signal for transmission over a data network of claim 6 wherein said encoder is remote from said video gateway, the system further comprising:
   a first converter in communication with said encoder for converting said compressed HD signal to an optical signal;
   a second converter in communication with said video gateway for converting said optical signal back to said compressed HD signal;
   an optical fiber connecting said first and second converters to carry said optical signal from said first converter to said second converter; and
   wherein the local loop comprises a 270 Mbps loop.

10. A method for preparing an High Definition (HD) signal for transmission over a data network including the steps of:
   (a) receiving an HD signal at a first data rate;
   (b) converting said HD signal to a compressed HD signal at a second data rate, said second data rate being lower than said first data rate, and wherein said HD signal and said compressed HD signal are digital signals;
   (c) transmitting, from a source location, said compressed HD signal via a local loop to a network point-of-presence that is remote from the source location;
   (d) converting said compressed HD signal into TCP/IP packets in a video gateway for transmission over a data network; and
   (e) delivering said TCP/IP packets to a router.

11. The method for preparing HD signals for transmission over a data network of claim 10 wherein said first data rate is 1.485 Gbps and the local loop is a 270 Mbps loop.

12. The method for preparing HD signals for transmission over a data network of claim 10 wherein said second data rate is 270 Mbps.

13. The method for preparing HD signals for transmission over said data network of claim 10 wherein said first HD signal conforms to SMPTE292.

14. The method for preparing HD signals for transmission over a data network of claim 10 wherein said data network is an MPLS network and said router is a label edge router.

\* \* \* \* \*